(12) United States Patent
Naito

(10) Patent No.: US 12,477,894 B2
(45) Date of Patent: Nov. 18, 2025

(54) FOLDED OR ROLLED DISPLAY DEVICE HAVING THERMAL SHRINKAGE RATES

(71) Applicant: JOLED INC., Tokyo (JP)

(72) Inventor: Nobuo Naito, Tokyo (JP)

(73) Assignee: Magnolia Blue Corporation, Tokyo (JP)

(*) Notice: Subject to any disclaimer, the term of this patent is extended or adjusted under 35 U.S.C. 154(b) by 621 days.

(21) Appl. No.: 17/821,969

(22) Filed: Aug. 24, 2022

(65) Prior Publication Data
US 2023/0063788 A1 Mar. 2, 2023

(30) Foreign Application Priority Data
Aug. 27, 2021 (JP) .................. 2021-139052

(51) Int. Cl.
| | |
|---|---|
| *H10K 50/84* | (2023.01) |
| *H10K 50/80* | (2023.01) |
| *G06F 1/16* | (2006.01) |
| *G09F 9/30* | (2006.01) |
| *H10K 77/10* | (2023.01) |
| *H10K 102/00* | (2023.01) |

(52) U.S. Cl.
CPC .......... *H10K 50/84* (2023.02); *H10K 50/868* (2023.02); *G06F 1/1641* (2013.01); *G06F 1/1652* (2013.01); *G09F 9/301* (2013.01); *H10K 77/10* (2023.02); *H10K 2102/311* (2023.02)

(58) Field of Classification Search
CPC .... H10K 50/84; H10K 50/868; H10K 59/873; H10K 77/10; H10K 77/111; G06F 1/1641; G06F 1/1652; G06F 9/301
See application file for complete search history.

(56) References Cited

U.S. PATENT DOCUMENTS

| | | | | |
|---|---|---|---|---|
| 10,345,856 | B2* | 7/2019 | Song .................. | H05K 1/028 |
| 11,158,834 | B2* | 10/2021 | Ha ...................... | G09G 5/14 |
| 2013/0222416 | A1* | 8/2013 | Kim ..................... | G09G 3/20 |
| | | | | 345/173 |

(Continued)

FOREIGN PATENT DOCUMENTS

| | | |
|---|---|---|
| CN | 109073927 A | 12/2018 |
| CN | 110164315 A | 8/2019 |

(Continued)

OTHER PUBLICATIONS

Office Action for CN Patent Application No. 202210888326.7, issued on Aug. 12, 2024, 11 pages.

(Continued)

*Primary Examiner* — Ida M Soward
(74) *Attorney, Agent, or Firm* — CHIP LAW GROUP

(57) ABSTRACT

A display device includes a display panel capable of being rolled up or folded and a cover member that is placed upon the display panel and that is capable of being rolled up or folded together with the display panel. A thermal shrinkage rate of the cover member in a bending direction along which the display panel is bent when the display panel is rolled up is smaller than a thermal shrinkage rate of the cover member in a perpendicular direction that is perpendicular to the bending direction, or a thermal shrinkage rate of the cover member in a bending direction along which the display panel is bent when the display panel is folded is smaller than a thermal shrinkage rate of the cover member in a perpendicular direction that is perpendicular to the bending direction.

6 Claims, 8 Drawing Sheets

(56) References Cited

U.S. PATENT DOCUMENTS

| | | | |
|---|---|---|---|
| 2014/0226275 A1* | 8/2014 | Ko | G06F 1/1601 |
| | | | 361/679.27 |
| 2015/0227173 A1* | 8/2015 | Hwang | G06F 1/1652 |
| | | | 345/619 |
| 2016/0062018 A1* | 3/2016 | Namkung | G02F 1/13363 |
| | | | 359/489.07 |
| 2016/0209970 A1* | 7/2016 | Lee | G06F 1/1652 |
| 2016/0245970 A1 | 8/2016 | Um et al. | |
| 2016/0274676 A1* | 9/2016 | Jung | G06F 1/1675 |
| 2017/0171939 A1* | 6/2017 | Yang | G06F 1/1652 |
| 2018/0138442 A1* | 5/2018 | Kim | H10K 77/111 |
| 2018/0151835 A1* | 5/2018 | Kim | H10K 59/8731 |
| 2018/0341142 A1* | 11/2018 | Choi | G06F 1/1643 |
| 2020/0159285 A1* | 5/2020 | Kim | G06F 1/1652 |
| 2021/0088841 A1 | 3/2021 | Shin et al. | |
| 2021/0375167 A1* | 12/2021 | Lin | G06F 1/1652 |
| 2022/0252763 A1 | 8/2022 | Nishio et al. | |

FOREIGN PATENT DOCUMENTS

| | | | |
|---|---|---|---|
| EP | 2990200 A1 | 3/2016 | |
| JP | 2016535159 A | 11/2016 | |
| JP | 2020197705 A | 12/2020 | |
| JP | 2021059112 A | 4/2021 | |
| WO | 2014175137 A1 | 10/2014 | |
| WO | 2016203340 A1 | 12/2016 | |
| WO | WO-2020145525 A1 * | 7/2020 | G06F 1/1616 |
| WO | 2021017076 A1 | 2/2021 | |

OTHER PUBLICATIONS

Office Action for Japanese Patent Application No. 2021-139052, issued on May 23, 2023, 2 pages of Office Action.

Office Action for CN Patent Application No. 202210888326.7, issued on Jan. 15, 2025, 10 pages.

* cited by examiner

# FOLDED OR ROLLED DISPLAY DEVICE HAVING THERMAL SHRINKAGE RATES

CROSS REFERENCE

The present disclosure contains subject matter related to that disclosed in Japanese Priority Patent Application JP 2021-139052 filed in the Japan Patent Office on Aug. 27, 2021, the entire content of which is hereby incorporated by reference.

BACKGROUND

The present disclosure relates to a display device, and, in particular, relates to a display device including a display panel having flexibility.

Display devices including a display panel having flexibility have been known. As an example of this type of display devices, a foldable display provided with a polyester film for protecting an organic electroluminescent (EL) module is described in JP 2020-197705A.

SUMMARY

However, the foldable display described in JP 2020-197705A has a problem in that the polyester film for protecting the organic EL module tends to easily undergo thermal shrinkage along a bending direction of the organic EL module, which leads to unwanted bending of the organic EL module when the organic EL module is in a spread-out state. Meanwhile, a known display device including a display panel capable of being rolled up has a problem in that a cover member for protecting the display panel tends to easily undergo thermal shrinkage along a bending direction of the display panel, which leads to unwanted bending of the display panel when the display panel is in a spread-out state. It is conceivable to pull the display panel tight in order to prevent or reduce unwanted bending of the display panel, but pulling the display panel tight may cause damage to the display panel.

The present disclosure has been conceived to overcome the above problems, and it is desirable to provide a display device that is able to prevent or reduce unwanted bending of a display panel when the display panel is in a spread-out state while minimizing the likelihood of damage to the display panel.

A display device according to an embodiment of the present disclosure includes a display panel capable of being rolled up or folded and a cover member that is placed upon the display panel and that is capable of being rolled up or folded together with the display panel. A thermal shrinkage rate of the cover member in a bending direction along which the display panel is bent when the display panel is rolled up is smaller than a thermal shrinkage rate of the cover member in a perpendicular direction that is perpendicular to the bending direction, or a thermal shrinkage rate of the cover member in a bending direction along which the display panel is bent when the display panel is folded is smaller than a thermal shrinkage rate of the cover member in a perpendicular direction that is perpendicular to the bending direction.

A display device according to another embodiment of the present disclosure includes a display panel capable of being rolled up or folded, a cover member that is placed upon the display panel and that is capable of being rolled up or folded together with the display panel, and a circularly polarizing plate that is placed between the display panel and the cover member and that is capable of being rolled up or folded together with the display panel. The cover member does not undergo thermal shrinkage. A thermal shrinkage rate of the circularly polarizing plate in a bending direction along which the display panel is bent when the display panel is rolled up is smaller than a thermal shrinkage rate of the circularly polarizing plate in a perpendicular direction that is perpendicular to the bending direction, or a thermal shrinkage rate of the circularly polarizing plate in a bending direction along which the display panel is bent when the display panel is folded is smaller than a thermal shrinkage rate of the circularly polarizing plate in a perpendicular direction that is perpendicular to the bending direction.

Each of the display devices according to the above embodiments of the present disclosure is able to prevent or reduce unwanted bending of the display panel when the display panel is in a spread-out state while minimizing the likelihood of damage to the display panel.

DETAILED DESCRIPTION OF THE PREFERRED EMBODIMENTS

Figure 1A:
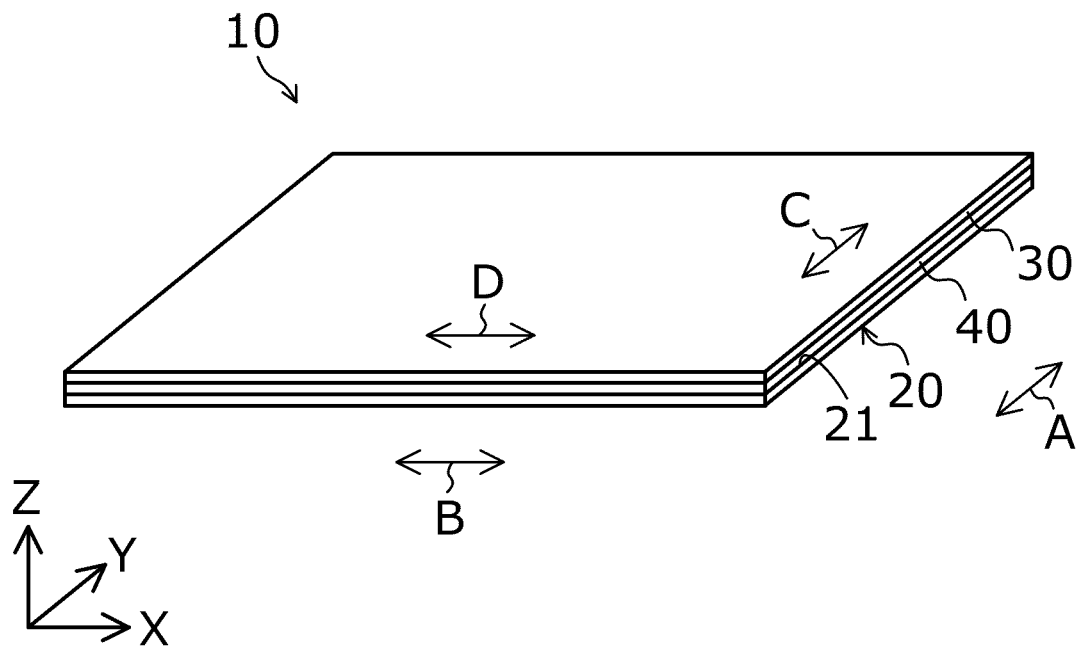
FIG. 1A and FIG. 1B are perspective views of a display device according to a first embodiment of the present disclosure.

Hereinafter, display devices according to embodiments of the present disclosure will be described with reference to the accompanying drawings. It is to be appreciated that each of the embodiments described below represents a specific example of the present disclosure. Therefore, numerical values, constituent elements, positions at which the constituent elements are disposed, forms of connection of the constituent elements, and other features disclosed in the following descriptions of the embodiments are merely examples and should not be construed as limiting the present disclosure. Accordingly, constituent elements of the embodiments that are described below but are not recited in the independent claims will be described as optional constituent elements.

In the accompanying drawings, substantially the same constituent elements are denoted by the same reference characters. In addition, each of the accompanying drawings is a schematic diagram and does not necessarily represent, for example, relative sizes of parts in a precise manner.

First Embodiment

Figure 1B:
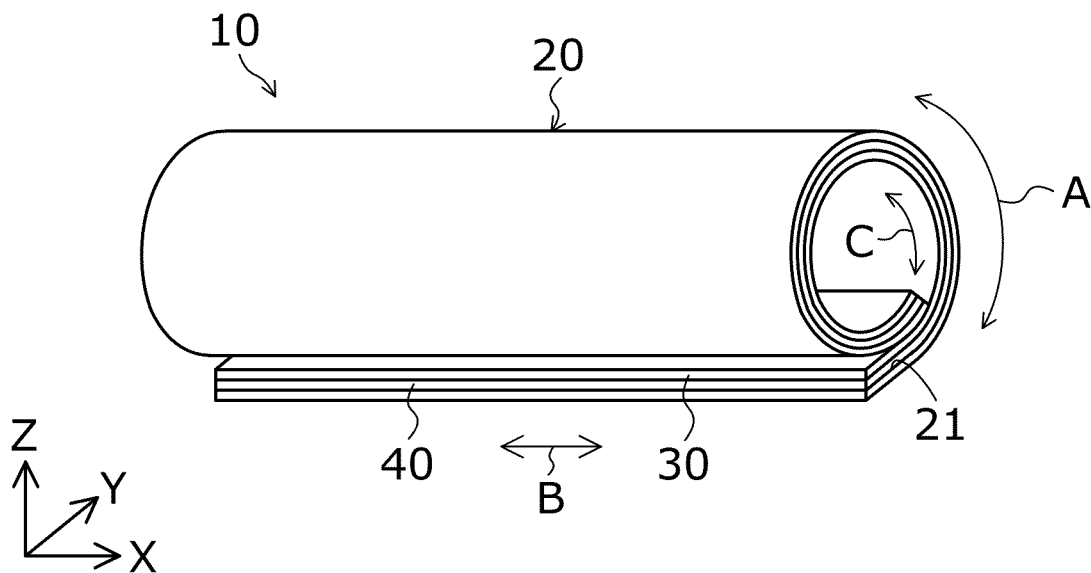
Figure 2:
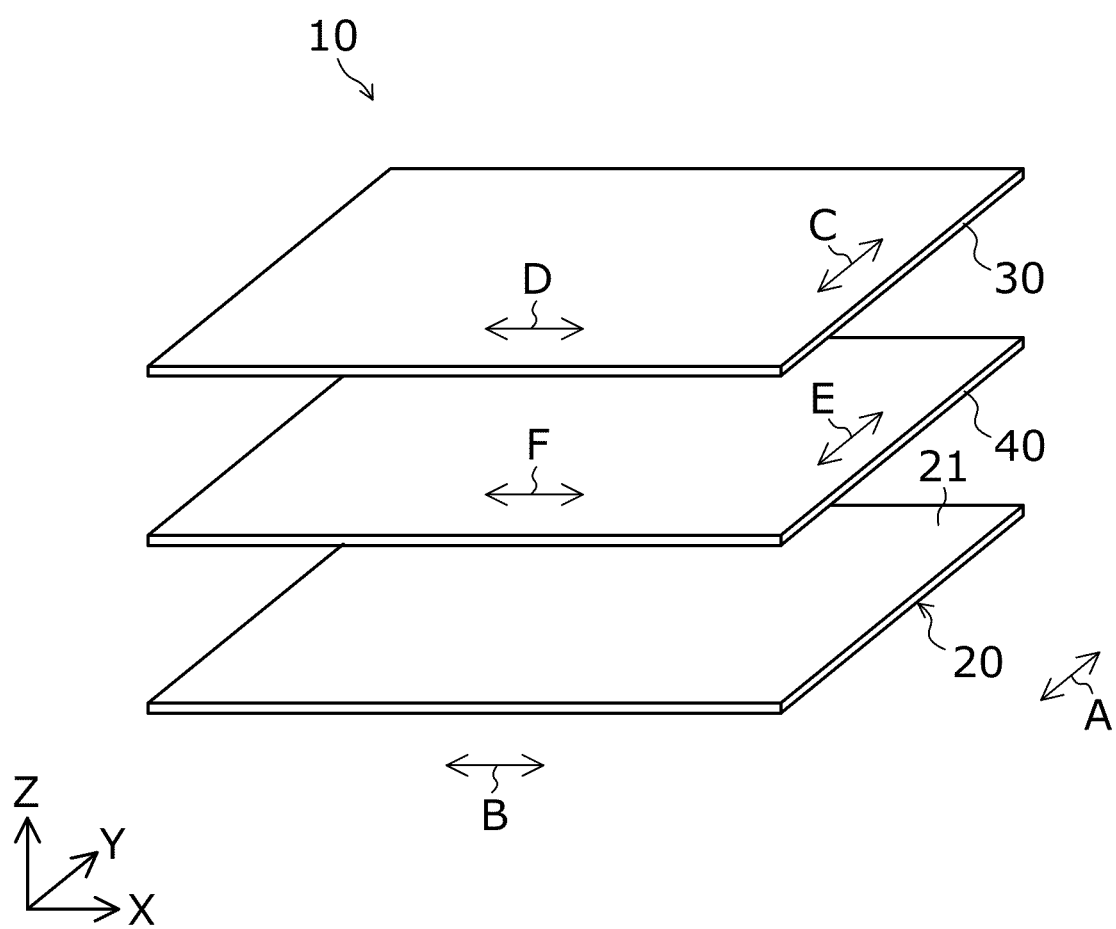
FIG. 2 is an exploded perspective view of the display device illustrated in FIG. 1A and FIG. 1B.

FIG. 1A and FIG. 1B are perspective views of a display device 10 according to a first embodiment of the present disclosure. Here, FIG. 1A illustrates the display device 10 in a state in which a display panel 20 and other members are spread out, while FIG. 1B illustrates the display device 10 in a state in which the display panel 20 and the other members have been rolled up. FIG. 2 is an exploded perspective view of the display device 10 illustrated in FIG. 1A and FIG. 1B. The display device 10 according to the first embodiment will be described below with reference to FIG. 1A to FIG. 2.

As illustrated in FIG. 1A to FIG. 2, the display device 10 is a device that displays an image, and includes the display panel 20, a cover member 30, and a circularly polarizing plate 40. The display device 10 is a rollable display device, and the display panel 20, the cover member 30, and the circularly polarizing plate 40 can be rolled up, while the display panel 20 and the other members in a rolled-up state can be spread out. The display device 10 is used in, for example, a tablet terminal, a digital television, digital signage, a smart phone, a wearable terminal, or other apparatuses.

The display panel 20 is a display panel capable of being rolled up. The display panel 20 has flexibility and is what is called a flexible display panel. The display panel 20 displays an image. For example, the display panel 20 is connected to a driving board (not depicted) through a flexible board (not depicted) and is driven by the driving board to display an image. The display panel 20 includes a display screen 21 on which the image is displayed.

The display panel 20 is a plate-shaped member that extends in a first direction and a second direction perpendicular to the first direction and that has a thickness direction parallel to a third direction perpendicular to both the first direction and the second direction when being in a spread-out state, and displays an image toward one side in the third direction (i.e., a positive side in a Z-axis direction). In the spread-out state, the display panel 20 is rectangular when viewed in the third direction. The first direction is a direction represented by an X-axis in FIG. 1A, FIG. 1B, and other figures, the second direction is a direction represented by a Y-axis in FIG. 1A, FIG. 1B, and other figures, and the third direction is a direction represented by a Z-axis in FIG. 1A, FIG. 1B, and other figures. Note that the display panel 20 may not be rectangular and may alternatively be in the shape of another polygon, circular, or elliptical, for example, when being in the spread-out state.

The display panel 20 is rolled up about the first direction. That is, the display panel 20 is bent about the first direction when being in the rolled-up state. In the present embodiment, the display panel 20 is rolled up such that the cover member 30 and the circularly polarizing plate 40 are positioned inward of the display panel 20.

A bending direction A along which the display panel 20 is bent when the display panel 20 is rolled up is parallel to principal surfaces (including the display screen 21) of the display panel 20. The bending direction A coincides with the second direction when the display panel 20 is in the spread-out state, and is bent about the first direction when the display panel 20 is in the rolled-up state.

A perpendicular direction B which is perpendicular to the bending direction A is parallel to the principal surfaces (including the display screen 21) of the display panel 20 and coincides with the first direction.

For example, the display panel 20 is an organic light emitting diode (OLED) panel and has a stack of layers of thin film transistors (TFTs), OLEDs having organic EL elements, and thin film encapsulation (TFE).

The cover member 30 is placed upon the display panel 20 and is capable of being rolled up together with the display panel 20. The cover member 30 is placed on a side of the display panel 20 on which the display screen 21 lies, and is disposed to cover the display panel 20 and the circularly polarizing plate 40. The cover member 30 allows light emitted from the display panel 20 to pass therethrough. The cover member 30 has flexibility.

The cover member 30 is a plate-shaped member that extends in the first direction and the second direction and that has a thickness direction parallel to the third direction when being in a spread-out state. In the spread-out state, the cover member 30 is rectangular when viewed in the third direction. Note that the cover member 30 may not be rectangular and may alternatively be in the shape of another polygon, circular, or elliptical, for example, when being in the spread-out state.

The thermal shrinkage rate of the cover member 30 in the bending direction A is smaller than the thermal shrinkage rate of the cover member 30 in the perpendicular direction B. That is, the cover member 30 is placed upon the display panel 20 such that the thermal shrinkage rate of the cover member 30 in the bending direction A is smaller than the thermal shrinkage rate of the cover member 30 in the perpendicular direction B. In the case where the cover member 30 undergoes thermal shrinkage in each of directions C and D which are parallel to principal surfaces of the cover member 30 and which are perpendicular to each other, for example, the cover member 30 is placed upon the display panel 20 such that the direction C, in which the thermal shrinkage rate of the cover member 30 is smaller than that in the direction D, coincides with the bending direction A.

In the present embodiment, the direction C is a direction in which the cover member 30 has the smallest thermal shrinkage rate, and the cover member 30 is placed upon the display panel 20 such that the direction C, in which the cover member 30 has the smallest thermal shrinkage rate, coincides with the bending direction A. That is, in the present embodiment, the direction C, in which the cover member 30 has the smallest thermal shrinkage rate, coincides with the bending direction A. In the case where the cover member 30 undergoes thermal shrinkage in each of a plurality of directions that are parallel to the principal surfaces of the cover member 30 and that cross each other, for example, the cover member 30 is placed upon the display panel 20 such that the direction C, in which the cover member 30 has a smaller thermal shrinkage rate than in any other of the plurality of directions, coincides with the bending direction A.

The cover member 30 is, for example, adhered to the circularly polarizing plate 40 with an optical adhesive sheet (not depicted) intervening therebetween. An acrylic, silicone, epoxy, or rubber adhesive, for example, can be used as the optical adhesive sheet. The cover member 30 is, for example, formed by using polyethylene terephthalate (PET) having a hard coat (HC) layer. The cover member 30 may, for example, have one layer or have a laminated structure with different materials laminated.

The circularly polarizing plate 40 is placed between the display panel 20 and the cover member 30 and is capable of being rolled up together with the display panel 20. The circularly polarizing plate 40 is placed on the side of the display panel 20 on which the display screen 21 lies, and is disposed to cover the display panel 20. The circularly polarizing plate 40 includes a polarizer and a waveplate placed upon the polarizer. For example, the circularly polarizing plate 40 functions to increase contrast of a displayed image by minimizing reflection of external light from the surface of the panel. The circularly polarizing plate 40 has flexibility.

The circularly polarizing plate 40 is a plate-shaped member that extends in the first direction and the second direction and that has a thickness direction parallel to the third direction when being in a spread-out state. In the spread-out state, the circularly polarizing plate 40 is rectangular when viewed in the third direction. Note that the circularly polarizing plate 40 may not be rectangular and may alternatively be in the shape of another polygon, circular, or elliptical, for example, when being in the spread-out state.

The thermal shrinkage rate of the circularly polarizing plate 40 in the bending direction A is smaller than the thermal shrinkage rate of the circularly polarizing plate 40 in the perpendicular direction B. That is, the circularly polarizing plate 40 is placed between the display panel 20 and the cover member 30 such that the thermal shrinkage rate of the circularly polarizing plate 40 in the bending direction A is smaller than the thermal shrinkage rate of the circularly polarizing plate 40 in the perpendicular direction B. In the case where the circularly polarizing plate 40 undergoes thermal shrinkage in each of directions E and F which are parallel to principal surfaces of the circularly polarizing plate 40 and which are perpendicular to each other, for example, the circularly polarizing plate 40 is placed upon the display panel 20 such that the direction E, in which the thermal shrinkage rate of the circularly polarizing plate 40 is smaller than that in the direction F, coincides with the bending direction A.

In the present embodiment, the direction E is a direction in which the circularly polarizing plate 40 has the smallest thermal shrinkage rate, and the circularly polarizing plate 40 is placed between the display panel 20 and the cover member 30 such that the direction E, in which the circularly polarizing plate 40 has the smallest thermal shrinkage rate, coincides with the bending direction A. That is, in the present embodiment, the direction E, in which the circularly polarizing plate 40 has the smallest thermal shrinkage rate, coincides with the bending direction A. In the case where the circularly polarizing plate 40 undergoes thermal shrinkage in each of a plurality of directions that are parallel to the principal surfaces of the circularly polarizing plate 40 and that cross each other, for example, the circularly polarizing plate 40 is placed between the display panel 20 and the cover member 30 such that the direction E, in which the circularly polarizing plate 40 has a smaller thermal shrinkage rate than in any other of the plurality of directions, coincides with the bending direction A.

The circularly polarizing plate 40 is, for example, adhered to the display panel 20 with an optical adhesive sheet (not depicted) intervening therebetween. An acrylic, silicone, epoxy, or rubber adhesive, for example, can be used as the optical adhesive sheet.

The display device 10 according to the first embodiment has been described above.

The display device 10 according to the first embodiment includes the display panel 20, which is capable of being rolled up, and the cover member 30, which is placed upon the display panel 20 and is capable of being rolled up together with the display panel 20. The thermal shrinkage rate of the cover member 30 in the bending direction A, along which the display panel 20 is bent when the display panel 20 is rolled up, is smaller than the thermal shrinkage rate of the cover member 30 in the perpendicular direction B, which is perpendicular to the bending direction A.

This contributes to preventing or reducing thermal shrinkage of the cover member 30 in the bending direction A, and this, in turn, contributes to preventing or reducing unwanted bending of the display panel 20 caused by thermal shrinkage of the cover member 30 in the bending direction A. Thus, unwanted bending of the display panel 20 can be prevented or reduced without the need to pull the display panel 20 tight, and this contributes to preventing or reducing unwanted bending of the display panel 20 when the display panel 20 is in the spread-out state while minimizing the likelihood of damage to the display panel 20.

In addition, in the display device 10 according to the first embodiment, the cover member 30 is placed upon the display panel 20 such that the direction C, in which the cover member 30 has the smallest thermal shrinkage rate, coincides with the bending direction A.

This contributes to more effectively preventing or reducing thermal shrinkage of the cover member 30 in the bending direction A, and this, in turn, contributes to more effectively preventing or reducing unwanted bending of the display panel 20 when the display panel 20 is in the spread-out state while minimizing the likelihood of damage to the display panel 20.

Further, the display device 10 according to the first embodiment further includes the circularly polarizing plate 40, which is placed between the display panel 20 and the cover member 30 and is capable of being rolled up together with the display panel 20, and the thermal shrinkage rate of the circularly polarizing plate 40 in the bending direction A is smaller than the thermal shrinkage rate of the circularly polarizing plate 40 in the perpendicular direction B.

This contributes to preventing or reducing thermal shrinkage of the circularly polarizing plate 40 in the bending direction A, and this, in turn, contributes to preventing or reducing unwanted bending of the display panel 20 caused by thermal shrinkage of the circularly polarizing plate 40 in the bending direction A. Thus, unwanted bending of the display panel 20 can be more effectively prevented or reduced without the need to pull the display panel 20 tight, and this contributes to more effectively preventing or reducing unwanted bending of the display panel 20 when the display panel 20 is in the spread-out state while minimizing the likelihood of damage to the display panel 20.

Moreover, in the display device 10 according to the first embodiment, the circularly polarizing plate 40 is placed between the display panel 20 and the cover member 30 such that the direction E, in which the circularly polarizing plate 40 has the smallest thermal shrinkage rate, coincides with the bending direction A.

This contributes to more effectively preventing or reducing thermal shrinkage of the circularly polarizing plate 40 in the bending direction A, and this, in turn, contributes to more effectively preventing or reducing unwanted bending of the display panel 20 when the display panel 20 is in the spread-out state while minimizing the likelihood of damage to the display panel 20.

In the above-described first embodiment, the thermal shrinkage rate of the circularly polarizing plate 40 in the bending direction A is smaller than the thermal shrinkage rate of the circularly polarizing plate 40 in the perpendicular direction B. Note, however, that this is not essential to the present disclosure. For example, the thermal shrinkage rate of the circularly polarizing plate 40 in the bending direction A may be greater than the thermal shrinkage rate of the circularly polarizing plate 40 in the perpendicular direction B. An important point is the direction in which the cover member 30 has the smallest thermal shrinkage rate.

In the above-described first embodiment, the display device 10 includes the display panel 20, the cover member 30, and the circularly polarizing plate 40. Note, however, that this is not essential to the present disclosure.

For example, the display device 10 may not include the circularly polarizing plate 40.

Also, note that the display device 10 may further include a winding device that rolls up the display panel 20 and other members; and a drawing device that draws out the display panel 20 and the other members in the rolled-up state, for example. The winding device includes, for example, a spool that is connected to end portions of the display panel 20 and the other members on one side and around which the display panel 20 and the other members are to be wound; and a motor that rotates the spool. Meanwhile, the drawing device includes, for example, a fixed member fixed to end portions of the display panel 20 and the other members on an opposite side; and a pantograph unit that pushes out the fixed member in a draw-out direction. This similarly applies to second and third embodiments of the present disclosure, which will be described below.

Second Embodiment

Figure 3:
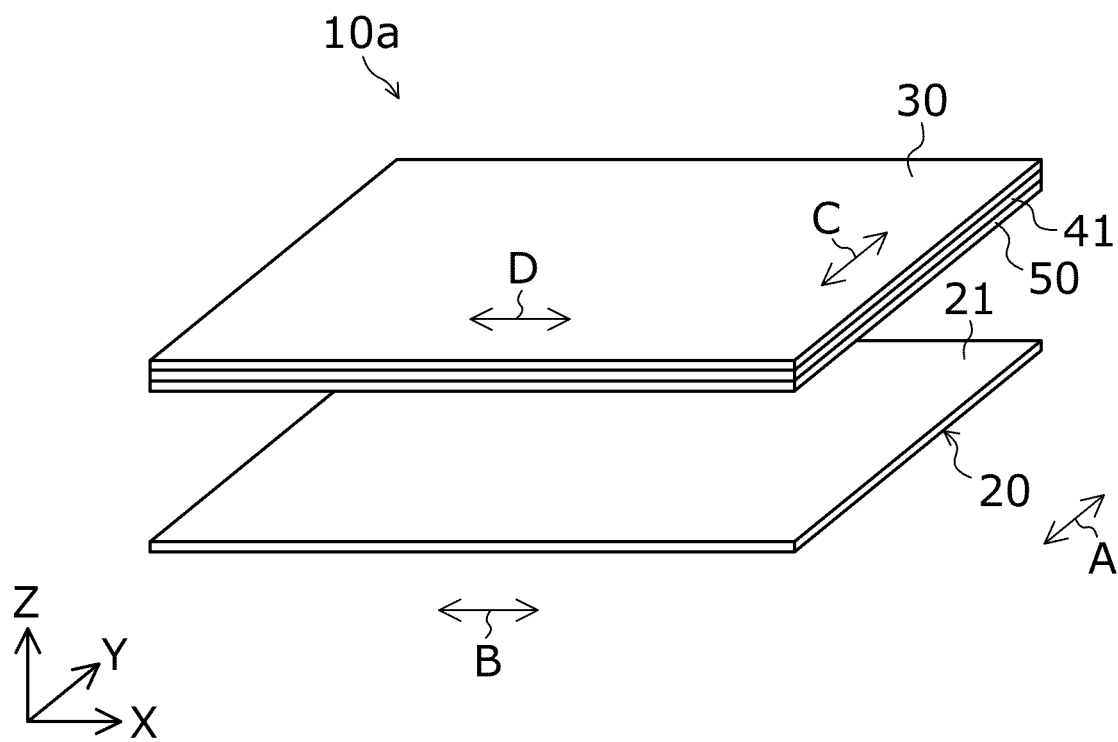
FIG. 3 is an exploded perspective view of a display device according to a second embodiment of the present disclosure.
Figure 4:
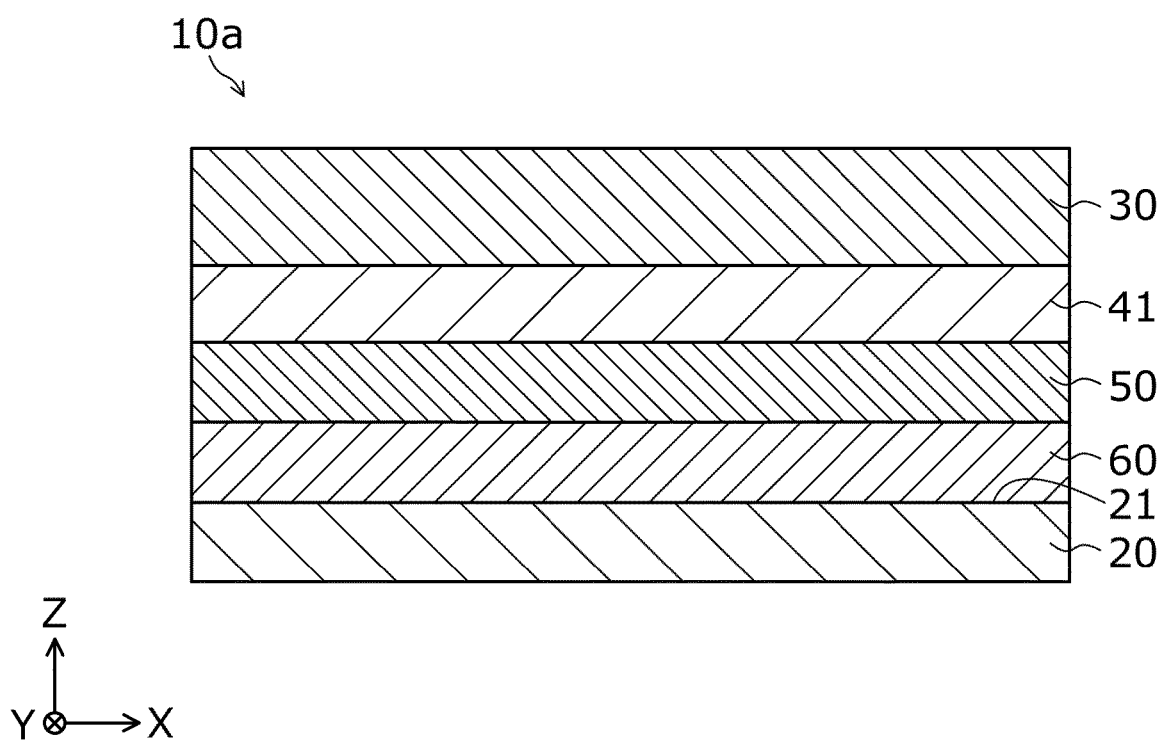
FIG. 4 is a sectional view of the display device illustrated in FIG. 3.

FIG. 3 is an exploded perspective view of a display device 10a according to the second embodiment. FIG. 4 is a sectional view of the display device 10a illustrated in FIG. 3. The display device 10a according to the second embodiment will be described below with reference to FIG. 3 and FIG. 4.

As illustrated in FIG. 3 and FIG. 4, the display device 10a is different from the display device 10 primarily in including a cover member 30 directly provided with a polarizer 41 and a waveplate 50 and in that the cover member 30, the polarizer 41, and the waveplate 50 are formed as a single piece. The polarizer 41 is obtained by impregnating polyvinyl alcohol (PVA) with polyiodine or a dye and extending the PVA in one direction. In the present embodiment, a circularly polarizing plate includes the polarizer 41 and the waveplate 50. That is, in the present embodiment, the cover member 30 and the circularly polarizing plate (including the polarizer 41 and the waveplate 50) are formed integrally with each other.

The cover member 30 and the polarizer 41 are formed integrally with each other. For example, in a process for making the circularly polarizing plate, the cover member 30 and the polarizer 41 are directly adhered to each other and are formed integrally with each other without an optical adhesive sheet intervening therebetween.

The waveplate 50 is disposed to prevent incoming external light from being reflected by a display panel 20 and passing therethrough to the outside. The waveplate 50 is placed between the display panel 20 and the polarizer 41. The waveplate 50 and the polarizer 41 are formed integrally with each other. For example, the waveplate 50 and the polarizer 41 are joined to each other by using an adhesive having a small thickness of 5 μm or an adhesive member having a small thickness of approximately 1 μm.

A bottom surface of the waveplate 50 is adhered to the display panel 20 with an optical adhesive sheet 60 intervening therebetween. An acrylic, silicone, epoxy, or rubber adhesive, for example, can be used as the optical adhesive sheet 60.

The display device 10a according to the second embodiment has been described above.

In the display device 10a according to the second embodiment, the cover member 30 and the circularly polarizing plate (including the polarizer 41 and the waveplate 50) are formed integrally with each other.

This eliminates the need to dispose an optical adhesive sheet under the cover member 30, making it possible to reduce the number of layers, and minimizes an effect of thermal shrinkage, which contributes to preventing or reducing unwanted bending of the display panel 20. Thus, unwanted bending of the display panel 20 when the display panel 20 is in the spread-out state can be more effectively prevented or reduced while the likelihood of damage to the display panel 20 is minimized. In addition, a bending deformation can similarly be prevented or reduced when the display device 10a is bent such that the cover member is positioned inward, along a direction in which the cover member undergoes slight thermal shrinkage.

Third Embodiment

Figure 5:
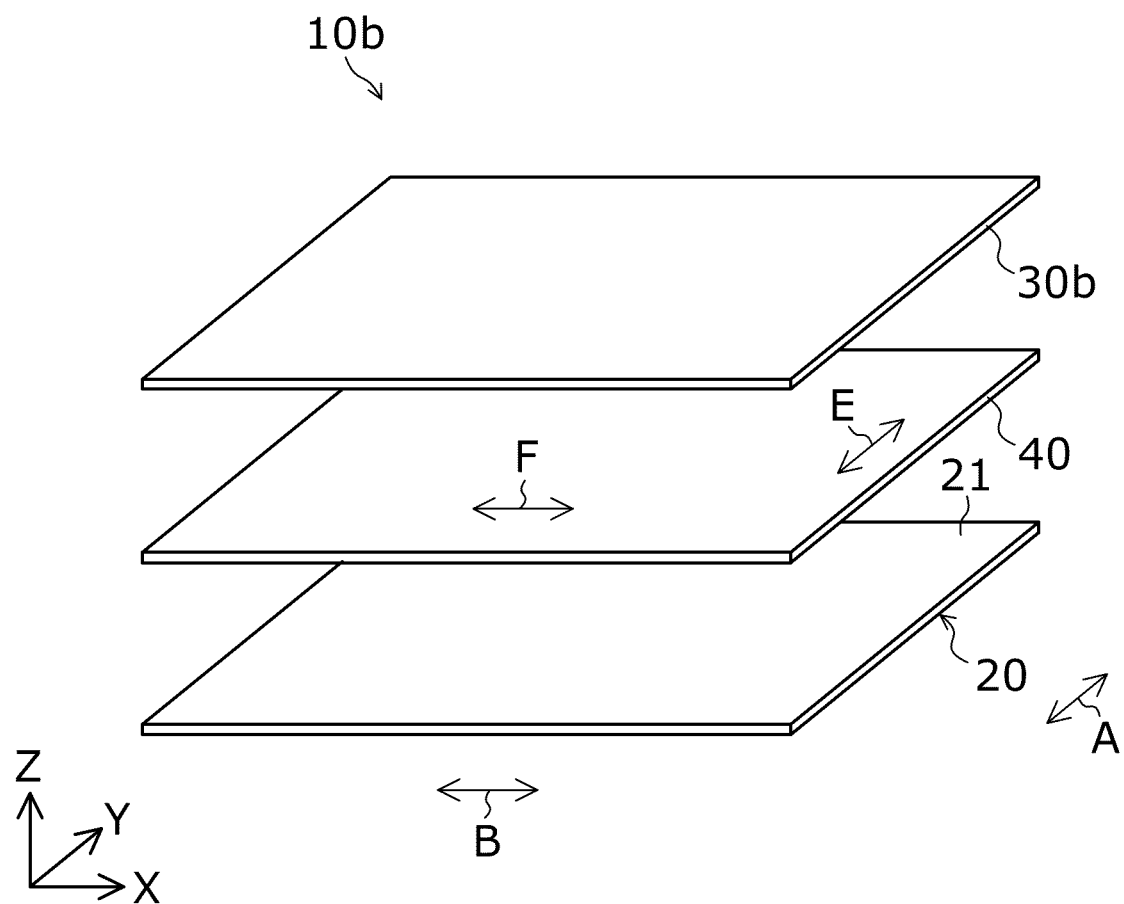
FIG. 5 is an exploded perspective view of a display device according to a third embodiment of the present disclosure.

FIG. 5 is an exploded perspective view of a display device 10b according to the third embodiment. The display device 10b according to the third embodiment will be described below with reference to FIG. 5.

As illustrated in FIG. 5, the display device 10b is different from the display device 10 primarily in including a cover member 30b in place of the cover member 30.

The cover member 30b is placed upon a display panel 20 and is capable of being rolled up together with the display panel 20. The cover member 30b is different from the cover member 30 primarily in not undergoing thermal shrinkage. The cover member 30b is made of a material that does not undergo thermal shrinkage. The cover member 30b is made of, for example, such glass as ultra thin glass (UTG). The cover member 30b is, for example, adhered to a circularly polarizing plate 40 by using an optical adhesive sheet (not depicted). The cover member 30b has a thickness of 70 μm, for example.

The display device 10b according to the third embodiment has been described above.

The display device 10b according to the third embodiment includes the display panel 20, which is capable of being rolled up, the cover member 30b, which is placed upon the display panel 20 and is capable of being rolled up together with the display panel 20, and the circularly polarizing plate 40, which is placed between the display panel 20 and the cover member 30b and is capable of being rolled up together with the display panel 20. The cover member 30b does not undergo thermal shrinkage, and the thermal shrinkage rate of the circularly polarizing plate 40 in the bending direction A, along which the display panel 20 is bent when the display panel 20 is rolled up, is smaller than the thermal shrinkage rate of the circularly polarizing plate 40 in the perpendicular direction B, which is perpendicular to the bending direction A.

Thus, the cover member 30b does not undergo thermal shrinkage, and this contributes to preventing or reducing unwanted bending of the display panel 20 due to thermal shrinkage of the cover member 30b. Moreover, thermal shrinkage of the circularly polarizing plate 40 in the bending direction A can be prevented or reduced, and this contributes to preventing or reducing unwanted bending of the display panel 20 caused by thermal shrinkage of the circularly polarizing plate 40 in the bending direction A. Thus, unwanted bending of the display panel 20 can be prevented or reduced without the need to pull the display panel 20 tight, and this contributes to preventing or reducing unwanted bending of the display panel 20 when the display panel 20 is in the spread-out state while minimizing the likelihood of damage to the display panel 20.

Fourth Embodiment

Figure 6A:
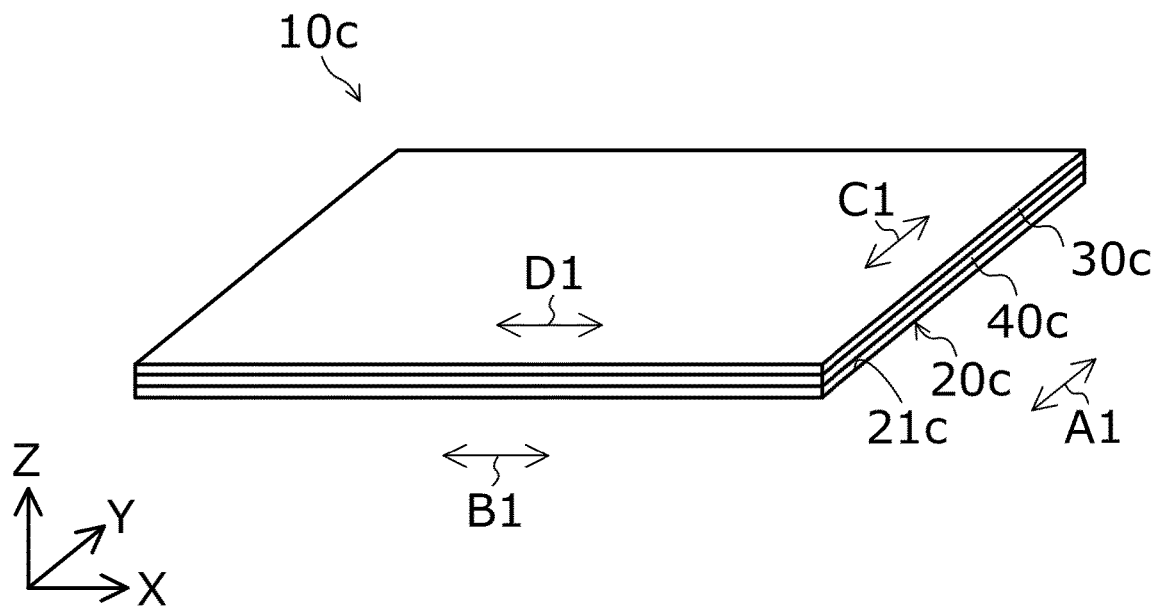
FIG. 6A and FIG. 6B are perspective views of a display device according to a fourth embodiment of the present disclosure.
Figure 6B:
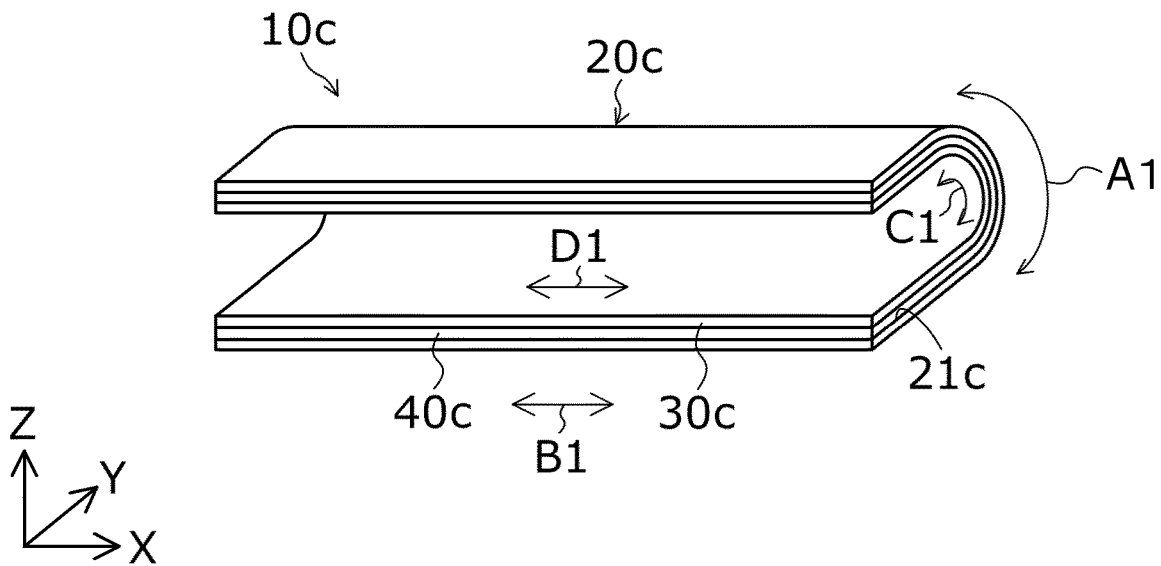
Figure 7:
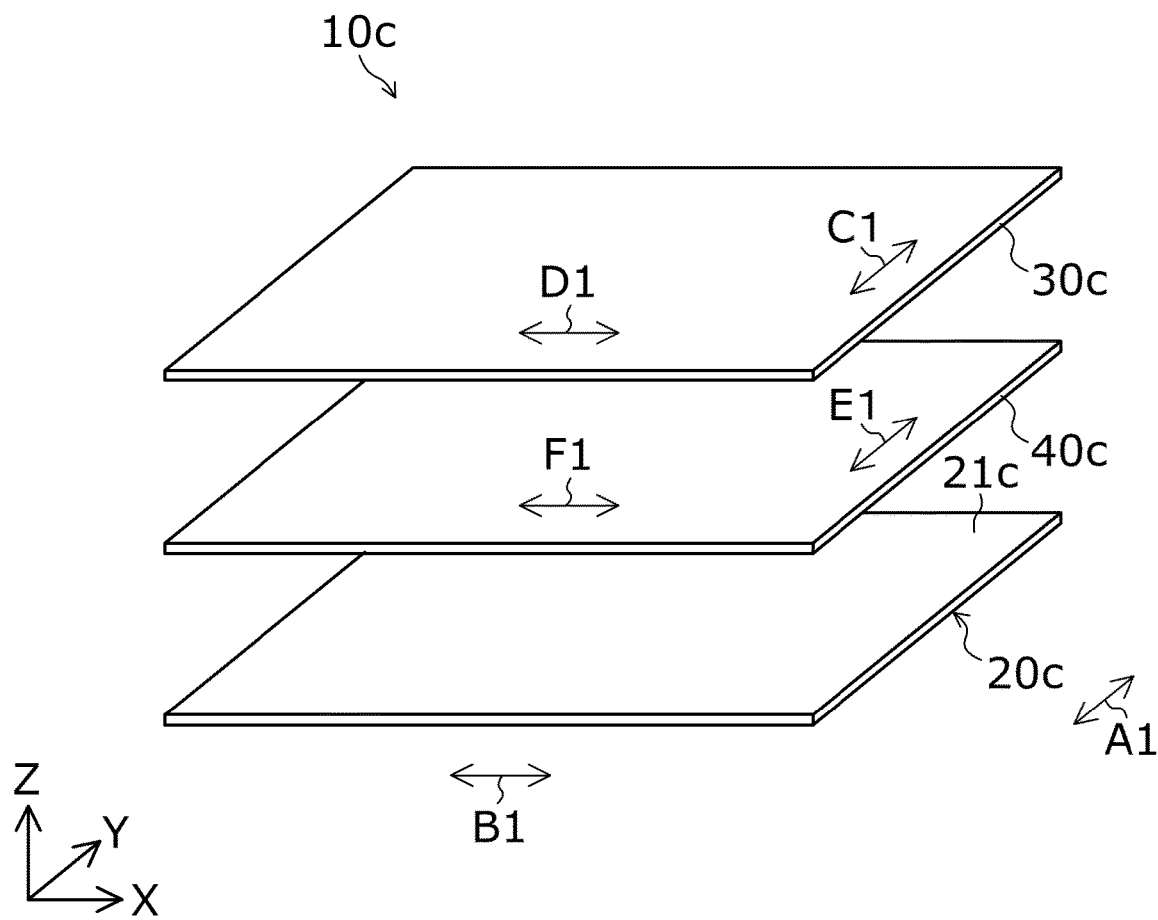
FIG. 7 is an exploded perspective view of the display device illustrated in FIG. 6A and FIG. 6B.

FIG. 6A and FIG. 6B are perspective views of a display device 10c according to a fourth embodiment of the present disclosure. Here, FIG. 6A illustrates the display device 10c in a state in which a display panel 20c and other members are spread out, while FIG. 6B illustrates the display device 10c in a state in which the display panel 20c and the other members are folded. FIG. 7 is an exploded perspective view of the display device 10c illustrated in FIG. 6A and FIG. 6B. The display device 10c according to the fourth embodiment will be described below with reference to FIG. 6A to FIG. 7.

As illustrated in FIG. 6A to FIG. 7, the display device 10c is a device that displays an image, and includes the display panel 20c, a cover member 30c, and a circularly polarizing plate 40c. The display device 10c is a foldable display device. The display panel 20c, the cover member 30c, and the circularly polarizing plate 40c can be folded, while the display panel 20c and the other members in a folded state can be spread out. The display device 10c is used in, for example, a tablet terminal, a digital television, digital signage, a smart phone, a wearable terminal, or other apparatuses.

The display panel 20c is a display panel capable of being folded. The display panel 20c has flexibility and is what is called a flexible display panel. The display panel 20c displays an image. For example, the display panel 20c is connected to a driving board (not depicted) through a flexible board (not depicted) and is driven by the driving board to display an image. The display panel 20c includes a display screen 21c on which the image is displayed.

The display panel 20c is a plate-shaped member that extends in the first direction and the second direction and that has a thickness direction parallel to the third direction when being in a spread-out state, and displays an image toward one side in the third direction (i.e., the positive side in the Z-axis direction). In the spread-out state, the display panel 20c is rectangular when viewed in the third direction. Note that the display panel 20c may not be rectangular and may alternatively be in the shape of another polygon, circular, or elliptical, for example, when being in the spread-out state.

The display panel 20c is folded about the first direction. That is, the display panel 20c is bent about the first direction when being in the folded state. In the present embodiment, the display panel 20c is folded such that the cover member 30c and the circularly polarizing plate 40c are positioned inward of the display panel 20c.

A bending direction A1 along which the display panel 20c is bent when the display panel 20c is folded is parallel to principal surfaces (including the display screen 21c) of the display panel 20c. The bending direction A1 coincides with the second direction when the display panel 20c is in the spread-out state, and is bent about the first direction when the display panel 20c is in the folded state.

A perpendicular direction B1 which is perpendicular to the bending direction A1 is parallel to the principal surfaces (including the display screen 21c) of the display panel 20c and coincides with the first direction.

For example, the display panel 20c is an OLED panel and has a stack of layers of TFTs, OLEDs having organic EL elements, and TFE.

The cover member 30c is placed upon the display panel 20c and is capable of being folded together with the display panel 20c. The cover member 30c is placed on a side of the display panel 20c on which the display screen 21c lies, and is disposed to cover the display panel 20c and the circularly polarizing plate 40c. The cover member 30c allows light emitted from the display panel 20c to pass therethrough. The cover member 30c has flexibility.

The cover member 30c is a plate-shaped member that extends in the first direction and the second direction and that has a thickness direction parallel to the third direction when being in a spread-out state. In the spread-out state, the cover member 30c is rectangular when viewed in the third direction. Note that the cover member 30c may not be rectangular and may alternatively be in the shape of another polygon, circular, or elliptical, for example, when being in the spread-out state.

The thermal shrinkage rate of the cover member 30c in the bending direction A1 is smaller than the thermal shrinkage rate of the cover member 30c in the perpendicular direction B1. That is, the cover member 30c is placed upon the display panel 20c such that the thermal shrinkage rate of the cover member 30c in the bending direction A1 is smaller than the thermal shrinkage rate of the cover member 30c in the perpendicular direction B1. In the case where the cover member 30c undergoes thermal shrinkage in each of directions C1 and D1 which are parallel to principal surfaces of the cover member 30c and which are perpendicular to each other, for example, the cover member 30c is placed upon the display panel 20c such that the direction C1, in which the thermal shrinkage rate of the cover member 30c is smaller than that in the direction D1, coincides with the bending direction A1.

In the present embodiment, the direction C1 is a direction in which the cover member 30c has the smallest thermal shrinkage rate, and the cover member 30c is placed upon the display panel 20c such that the direction C1, in which the cover member 30c has the smallest thermal shrinkage rate, coincides with the bending direction A1. That is, in the present embodiment, the direction C1, in which the cover member 30c has the smallest thermal shrinkage rate, coincides with the bending direction A1. In the case where the cover member 30c undergoes thermal shrinkage in each of a plurality of directions that are parallel to the principal surfaces of the cover member 30c and that cross each other, for example, the cover member 30c is placed upon the display panel 20c such that the direction C1, in which the cover member 30c has a smaller thermal shrinkage rate than in any other of the plurality of directions, coincides with the bending direction A1.

For example, the cover member 30c is adhered to the circularly polarizing plate 40c with an optical adhesive sheet (not depicted) intervening therebetween. An acrylic, silicone, epoxy, or rubber adhesive, for example, can be used as the optical adhesive sheet. The cover member 30c is, for example, formed by using PET having an HC layer.

The circularly polarizing plate 40c is placed between the display panel 20c and the cover member 30c and is capable of being folded together with the display panel 20c. The circularly polarizing plate 40c is placed on the side of the display panel 20c on which the display screen 21c lies, and is disposed to cover the display panel 20c. The circularly polarizing plate 40c has flexibility.

The circularly polarizing plate 40c is a plate-shaped member that extends in the first direction and the second direction and that has a thickness direction parallel to the third direction when being in a spread-out state. In the spread-out state, the circularly polarizing plate 40c is rectangular when viewed in the third direction. Note that the circularly polarizing plate 40c may not be rectangular and may alternatively be in the shape of another polygon, circular, or elliptical, for example, when being in the spread-out state.

The thermal shrinkage rate of the circularly polarizing plate 40c in the bending direction A1 is smaller than the thermal shrinkage rate of the circularly polarizing plate 40c in the perpendicular direction B1. That is, the circularly polarizing plate 40c is placed upon the display panel 20c such that the thermal shrinkage rate of the circularly polarizing plate 40c in the bending direction A1 is smaller than the thermal shrinkage rate of the circularly polarizing plate 40c in the perpendicular direction B1. In the case where the circularly polarizing plate 40c undergoes thermal shrinkage in each of directions E1 and F1 which are parallel to principal surfaces of the circularly polarizing plate 40c and which are perpendicular to each other, for example, the circularly polarizing plate 40c is placed upon the display panel 20c such that the direction E1, in which the thermal shrinkage rate of the circularly polarizing plate 40c is smaller than that in the direction F1, coincides with the bending direction A1.

In the present embodiment, the direction E1 is a direction in which the circularly polarizing plate 40c has the smallest thermal shrinkage rate, and the circularly polarizing plate 40c is placed between the display panel 20c and the cover member 30c such that the direction E1, in which the circularly polarizing plate 40c has the smallest thermal shrinkage rate, coincides with the bending direction A1. That is, in the present embodiment, the direction E1, in which the circularly polarizing plate 40c has the smallest thermal shrinkage rate, coincides with the bending direction A1. In the case where the circularly polarizing plate 40c undergoes thermal shrinkage in each of a plurality of directions that are parallel to the principal surfaces of the circularly polarizing plate 40c and that cross each other, for example, the circularly polarizing plate 40c is placed between the display panel 20c and the cover member 30c such that the direction E1, in which the circularly polarizing plate 40c has a smaller thermal shrinkage rate than in any other of the plurality of directions, coincides with the bending direction A1.

The circularly polarizing plate 40c is, for example, adhered to the display panel 20c with an optical adhesive sheet (not depicted) intervening therebetween. An acrylic, silicone, epoxy, or rubber adhesive, for example, can be used as the optical adhesive sheet.

The display device 10c according to the fourth embodiment has been described above.

The display device 10c according to the fourth embodiment includes the display panel 20c, which is capable of being folded, and the cover member 30c, which is placed upon the display panel 20c and is capable of being folded together with the display panel 20c. The thermal shrinkage rate of the cover member 30c in the bending direction A1, along which the display panel 20c is bent when the display panel 20c is folded, is smaller than the thermal shrinkage rate of the cover member 30c in the perpendicular direction B1, which is perpendicular to the bending direction A1.

This contributes to preventing or reducing thermal shrinkage of the cover member 30c in the bending direction A1, and this, in turn, contributes to preventing or reducing unwanted bending of the display panel 20c caused by thermal shrinkage of the cover member 30c in the bending direction A1. Thus, unwanted bending of the display panel 20c can be prevented or reduced without the need to pull the display panel 20c tight, and this contributes to preventing or reducing unwanted bending of the display panel 20c when the display panel 20c is in the spread-out state while minimizing the likelihood of damage to the display panel 20c.

In the above-described fourth embodiment, the thermal shrinkage rate of the circularly polarizing plate 40c in the bending direction A1 is smaller than the thermal shrinkage rate of the circularly polarizing plate 40c in the perpendicular direction B1. Note, however, that this is not essential to the present disclosure. For example, the thermal shrinkage rate of the circularly polarizing plate 40c in the bending direction A1 may be greater than the thermal shrinkage rate of the circularly polarizing plate 40c in the perpendicular direction B1.

In the above-described fourth embodiment, the display device 10c includes the display panel 20c, the cover member 30c, and the circularly polarizing plate 40c. Note, however, that this is not essential to the present disclosure. For example, the display device 10c may include, in place of the cover member 30c, a cover member that does not undergo thermal shrinkage like the cover member 30b and that is capable of being folded together with the display panel 20c. Also, the display device 10c may not include the circularly polarizing plate 40c, for example. The display device 10c may be rolled up or folded such that the cover member 30c and the circularly polarizing plate 40c are positioned outward of the display panel 20c.

Figure 8:
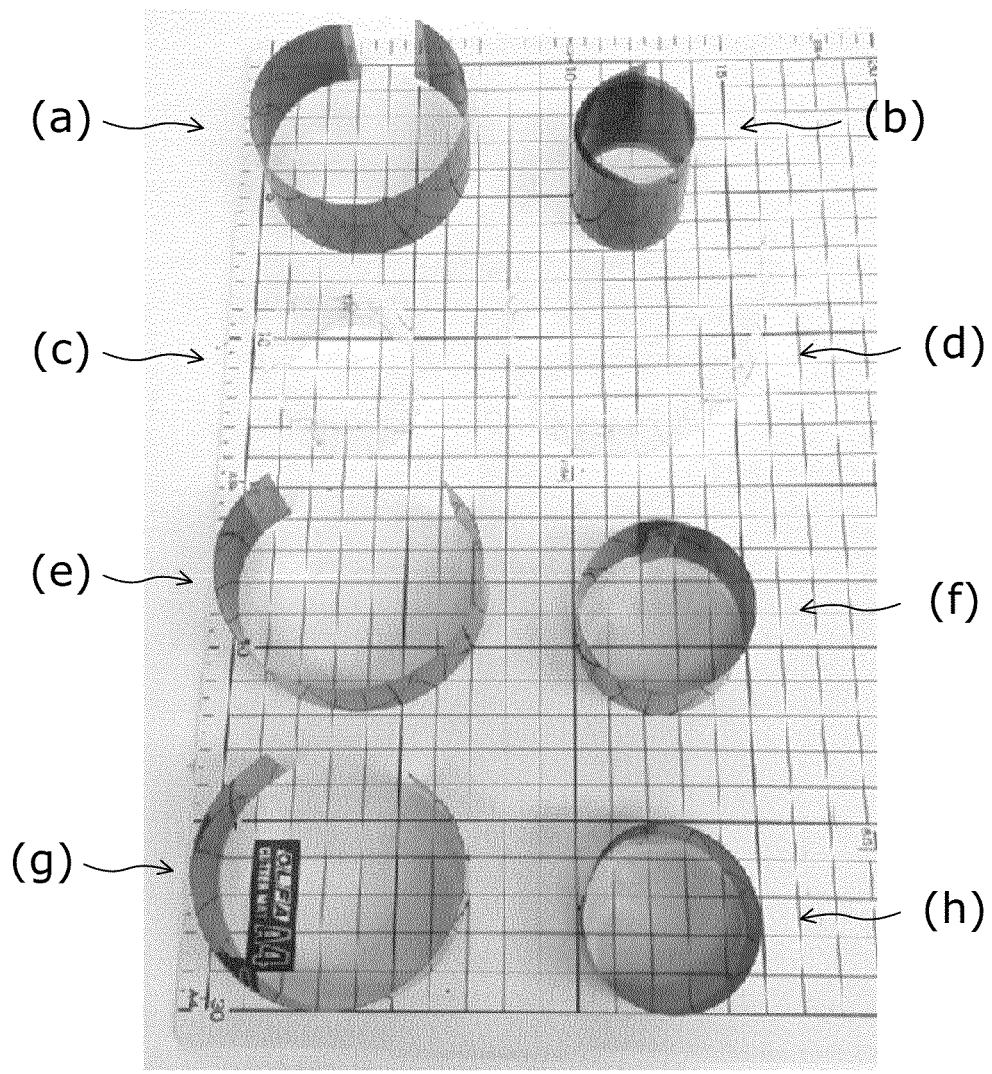
FIG. 8 depicts results of experiments on curling of a display panel and other members.

FIG. 8 depicts results of experiments on curling of the display panel and other members. With reference to FIG. 8, the results of the experiments on the curling of the display panel and other members will be described below.

Test results in the second embodiment are depicted in (a) and (b) of FIG. 8. Each of (a) and (b) of FIG. 8 depicts a panel unit that includes the display panel and the circularly polarizing plate integrally formed with the cover, the display panel and the circularly polarizing plate being placed one upon the other, and that was allowed to stand in an environment at 95° C. for 18 hours in a state of being rolled up into a coil having a radius of approximately 20 mm and was then spread out. Here, (a) of FIG. 8 depicts the result in a case where the panel unit was rolled up such that the direction in which the circularly polarizing plate has the smallest thermal shrinkage rate coincides with the bending direction of the display panel, while (b) of FIG. 8 depicts the result in a case where the panel unit was rolled up such that the direction in which the circularly polarizing plate has the smallest thermal shrinkage rate is perpendicular to the bending direction of the display panel.

When (a) and (b) of FIG. 8 are compared with each other, a curl of the panel unit of (a) of FIG. 8 is looser than a curl of the panel unit of (b) of FIG. 8, which indicates that the curl tends to be looser in the case where the direction in which the circularly polarizing plate has the smallest thermal shrinkage rate coincides with the bending direction of the display panel than in the case where the direction in which the circularly polarizing plate has the smallest thermal shrinkage rate is perpendicular to the bending direction of the display panel.

Results of retesting based on JP 2020-197705A are depicted in (c) and (d) of FIG. 8. Each of (c) and (d) of FIG. 8 depicts a cover member alone that was allowed to stand in an environment at 95° C. for 18 hours in a state of being rolled up into a coil having a radius of approximately 20 mm and was then spread out. Here, (c) of FIG. 8 depicts the result in a case where the cover member was rolled up such that the direction in which the cover member has the smallest thermal shrinkage rate coincides with the bending direction of the cover member, while (d) of FIG. 8 depicts the result in a case where the cover member was rolled up such that the direction in which the cover member has the smallest thermal shrinkage rate is perpendicular to the bending direction of the cover member.

When (c) and (d) of FIG. 8 are compared with each other, a curl of the cover member of (d) of FIG. 8 is looser than a curl of the cover member of (c) of FIG. 8, which indicates that, in the case where the cover member alone is subjected to evaluation, the curl tends to be looser when the cover member is bent along a direction in which the cover member has a small refractive index or modulus of elasticity, even if the cover member has a large thermal shrinkage rate in that direction.

Each of (e) and (g) of FIG. 8 depicts a panel unit that includes a display panel, a circularly polarizing plate, an optical adhesive sheet, and a cover member placed one upon another in the order named and that was allowed to stand in an environment at 95° C. for 18 hours in a state of being rolled up into a coil having a radius of approximately 20 mm and was then spread out. Here, (e) of FIG. 8 depicts the result in a case where the panel unit was rolled up such that each of the direction in which the cover member has the smallest thermal shrinkage rate and the direction in which the circularly polarizing plate has the smallest thermal shrinkage rate coincides with the bending direction of the display panel. Meanwhile, (g) of FIG. 8 depicts the result in a case where the panel unit was rolled up such that the direction in which the cover member has the smallest thermal shrinkage rate coincides with the bending direction of the display panel while the direction in which the circularly polarizing plate has the smallest thermal shrinkage rate is perpendicular to the bending direction of the display panel. It is found from these results that it does not matter much in which direction the circularly polarizing plate has a large or a small thermal shrinkage rate, and that an important point is the direction in which the cover member has the smallest thermal shrinkage rate.

Each of (f) and (h) of FIG. 8 depicts a panel unit that includes a display panel, a circularly polarizing plate, an optical adhesive sheet, and a cover member placed one upon another in the order named and that was allowed to stand in an environment at 95° C. for 18 hours in a state of being rolled up into a coil having a radius of approximately 20 mm and was then spread out. Here, (f) of FIG. 8 depicts the result in a case where the panel unit was rolled up such that the direction in which the cover member has the smallest thermal shrinkage rate is perpendicular to the bending direction of the display panel while the direction in which the circularly polarizing plate has the smallest thermal shrinkage rate coincides with the bending direction of the display panel. Meanwhile, (h) of FIG. 8 depicts the result in a case where the panel unit was rolled up such that each of the direction in which the cover member has the smallest thermal shrinkage rate and the direction in which the circularly polarizing plate has the smallest thermal shrinkage rate is perpendicular to the bending direction of the display panel. It is found from these results as well that it does not matter much in which direction the circularly polarizing plate has a large or a small thermal shrinkage rate, and that an important point is the direction in which the cover member has the smallest thermal shrinkage rate.

The results of the experiments on the curling of the display panel and other members have been described above.

OTHER EMBODIMENTS, ETC.

While display devices according to embodiments of the present disclosure have been described above, it will be understood that the present disclosure is not limited to the above-described embodiments. The present disclosure includes modifications of the above-described embodiments which can be obtained by making various modifications conceivable by those skilled in the art to the above-described embodiments without departing from the gist of the present disclosure, and various types of devices containing display panels according to embodiments of the present disclosure.

Display devices according to embodiments of the present disclosure can be used in digital televisions, digital signage, smart phones, tablet terminals, wearable terminals, or other devices.

What is claimed is:

1. A display device comprising:
a display panel capable of being rolled up or folded; and
a cover member that is placed upon the display panel and that is capable of being rolled up or folded together with the display panel, wherein
a thermal shrinkage rate of the cover member in a bending direction along which the display panel is bent when the display panel is rolled up is smaller than a thermal shrinkage rate of the cover member in a perpendicular direction that is perpendicular to the bending direction, or
a thermal shrinkage rate of the cover member in a bending direction along which the display panel is bent when the display panel is folded is smaller than a thermal shrinkage rate of the cover member in a perpendicular direction that is perpendicular to the bending direction.

2. The display device according to claim 1, wherein the cover member is placed upon the display panel such that a direction in which the cover member has the smallest thermal shrinkage rate coincides with the bending direction.

3. The display device according to claim 1, further comprising:
a circularly polarizing plate that is placed between the display panel and the cover member and that is capable of being rolled up or folded together with the display panel, wherein
a thermal shrinkage rate of the circularly polarizing plate in the bending direction is smaller than a thermal shrinkage rate of the circularly polarizing plate in the perpendicular direction.

4. The display device according to claim 3, wherein the circularly polarizing plate is placed between the display panel and the cover member such that a direction in which the circularly polarizing plate has the smallest thermal shrinkage rate coincides with the bending direction.

5. The display device according to claim 3, wherein the cover member and the circularly polarizing plate are formed integrally with each other.

6. A display device comprising:
a display panel capable of being rolled up or folded;
a cover member that is placed upon the display panel and that is capable of being rolled up or folded together with the display panel; and
a circularly polarizing plate that is placed between the display panel and the cover member and that is capable of being rolled up or folded together with the display panel, wherein
the cover member does not undergo thermal shrinkage, and
a thermal shrinkage rate of the circularly polarizing plate in a bending direction along which the display panel is bent when the display panel is rolled up is smaller than a thermal shrinkage rate of the circularly polarizing plate in a perpendicular direction that is perpendicular to the bending direction, or a thermal shrinkage rate of the circularly polarizing plate in a bending direction along which the display panel is bent when the display panel is folded is smaller than a thermal shrinkage rate of the circularly polarizing plate in a perpendicular direction that is perpendicular to the bending direction.

* * * * *